3,572,376
POPPET VALVE
Gunther Pfeifer, Elyria, Ohio, and Richard H. Rosback, South Bend, Ind., assignors to The Bendix Corporation
Filed July 31, 1968, Ser. No. 749,093
Int. Cl. F16k 15/18, 17/04
U.S. Cl. 137—512.2                                     5 Claims

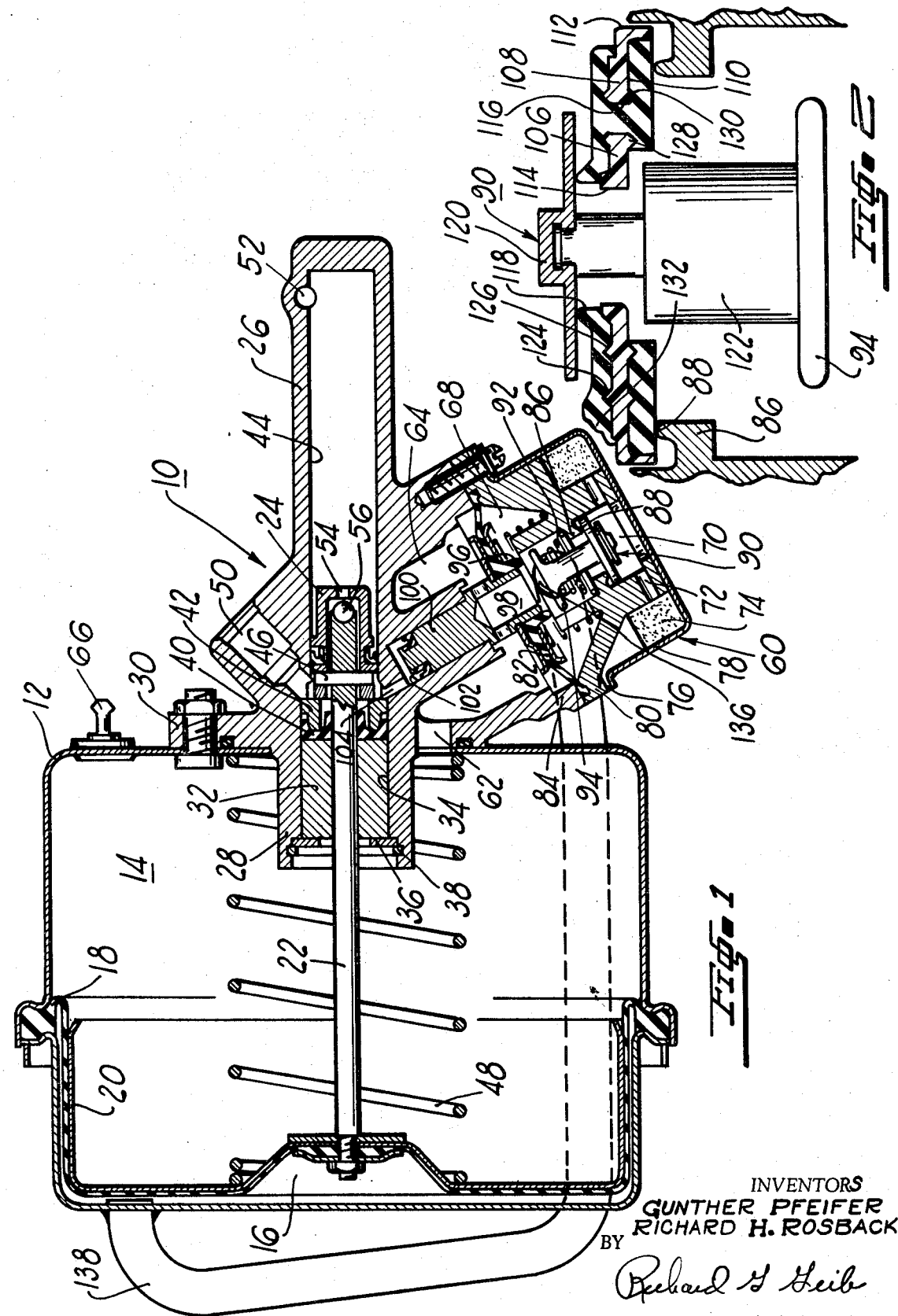

ABSTRACT OF THE DISCLOSURE

A poppet valve for a servomotor in a power braking system. The valve stem of the poppet valve has a small diameter which loosely extends through an opening in the housing connecting the control chamber with the atmospheric chamber. A disc-shaped reinforced member has a central opening loosely surrounding the valve stem. A peripheral skirt encloses a rubber material attached to the inner and outer surfaces of the reinforcing member. A cap member attached to the valve stem permits a spring operatively connected to a flange section of the stem to seat the cap member on the reinforcing member while the reinforcing member is seated on the opening in the housing. Upon application and release of the brakes, the valve stem will correspondingly move the reinforcing member with the rubber-like surfaces away from the openings to permit communication of atmospheric pressure to the control chamber where a conduit carries this pressure to a power chamber which operates the servomotor. After the reinforcing member has been unseated, the peripheral skirt will provide a bearing surface to guide the inner surface into seating alignment with the opening in the housing while the central opening in the reinforcing member will permit lateral movement with respect to the valve stem to assure seating of the cap member.

SUMMARY

As the state of the art has developed over the years in regard to fluid pressure servomotors for controlling braking systems, for example, it has become increasingly important to eliminate friction from the operation of the servomotor. As may be considered obvious by those skilled in the art to which this invention relates, the elimination of friction will provide a response characteristic of the servomotor that is more in line with the vehicle operator's senses of braking control.

It has been observed with regard to flexible poppet valves that the control of same has created possibilities that the valve itself will come into contact with the surrounding structure. As the valves are preferably of the rubber composition there will be significant frictional forces to operate the valve in the case it has contacted surrounding surfaces. Many attempts to circumvent this problem within the prior art have been observed whereby such poppet valves are connected by means of flexible diaphragms to the surrounding structure with the valve surfaces thereby being limited to a smaller area than has been desired for obtaining the fastest response possible of the servomotor.

It is a principal object of this invention to provide a poppet valve with a frictionless guiding surface which will permit the optimization of valve seat area and thereby increase the response time of the servomotor.

It is a more detailed object of this invention to provide a reinforcing ring for a valve of a frictionless composition such as nylon, for example, with a rubber valve surface on each side of the reinforcing ring and within the peripheral skirt of the ring forming the extremity which may or may not be in contact with the surrounding structure in which valve is located.

DRAWING DESCRIPTION

Other objects and advantages will appear from the following description of the drawings in which:

FIG. 1 is a cross sectional detail of a fluid pressure servomotor incorporating a valve in accordance with the purposes of this invention; and FIG. 2 is an enlarged cross sectional detail of the valve for utilization in the servomotor of FIG. 1 all in accordance with the principles of this invention.

DETAILED DESCRIPTION

With reference now to FIG. 1, the servomotor 10 is a vacuum suspended type and comprises a two-part housing 12 divided into two compartments 14 and 16 by a power piston formed of a flexible diaphragm 18 having its periphery clamped between the edges of the two housing parts. The diaphragm 18 lies over a cup 20 made of metal sheet and secured to the ends of a rod 22 which is adapted to displace a piston 24 of a slave hydraulic cylinder 26. The cylinder 26 is formed in a casting comprising a cylindrical portion 28 extending in the compartment 14 and sealingly secured to the housing 12 by means of a flange 30. A guide bearing 32 is retained in a bore 34 formed in the portion 28 by a washer 36 and a snap ring 38. The guide bearing 32 serves, therefore, to guide and support a rod 22. An annular seal 40 having a U-shaped cross section fitted in the bore 34 and sealingly engages the outer surface of the rod 22, and the ring 42, which abuts a shoulder formed in the inner end of the bore 34, presses the seal 40 against the end face of the bearing 32.

Hollow piston 24 slides in a bore 44 of the hydraulic cylinder 26. The rod 22 extends into the piston 24 and is connected thereto by means of a cross pin 46 having its end received in oversized holes formed in the wall of the piston, whereby a lost-motion connection is provided between the rod and piston.

The piston 24 is normally biased against the ring 42 by a return spring 48 compressed between the bottom of the housing 12 and the cup 20.

Hydraulic fluid supplied by a master cylinder (not shown) is communicated to the space behind the piston 24 through an inlet port 50, and the hydraulic pressure acts in addition to the force of the servomotor to displace the piston 24 in the bore 44. The hydraulic fluid in bore 44 is forced by piston 24 in the hydraulic circuit of the braking system through opening 52. To keep the hydraulic circuit of the braking system connected to the cylinder 26 full of hydraulic fluid, a passage 54 is provided in the piston 24 to communicate the inlet port 50 to the portion of the bore 44 in front of piston 24 when the latter is in its rest position, as shown in the drawing.

Rod 22 carries at its end a ball valve 56 which is aligned to close passage 54 when the rod is moved towards the right, as viewed in the drawing, to disconnect the inlet port 50 from the portion of the bore 44 located in front of piston 24.

Servomotor 10 includes a control valve 60 made in accordance with the invention and which controls the pressure differential acting on the diaphragm 18. The servomotor 10 is of the vacuum suspended type, as aforementioned, in which vacuum exists on both sides of the diaphragm 18 when the servomotor is at rest and at which atmospheric air is admitted in compartment 16 when operation of the servomotor is desired. Compartment 14 communicates through a passage 62 with a chamber 64 of the control valve and is permanently connected to a vacuum source via a vacuum check valve assembly 66, such as a vehicle's engine intake manifold or vacuum reservoir. The control valve 60 includes a control chamber 68 and an atmospheric chamber 70 communicated by passages 72 and filter 74 thereover to passages 76 between cap 78 and valve housing 80. A reaction diaphragm 82 seals the juncture of the housing 80 with boss 84 and separates the chambers 64 and 68 of the control valve 60. Chamber 68 is separated from chamber 70 by a rigid annular wall 86 having an annular valve seat 88 cooperating with a poppet assembly 90 that is biased thereonto by spring 92 which is between the wall 86 and a flange 94 of the poppet valve assembly 90, which flange 94 extends within the chamber 68 and is adapted to cooperate with a projecting beaded surface 96 of diaphragm 82 to seal communication of chambers 64 and 68 via passage 98 in plunger 100 centrally affixed to diaphragm 82. Plunger 100 is within bore 102 that is communicated by passage 104 to the portion of the bore 44 behind the piston 24 in communication with inlet 50.

With regard now to FIG. 2, the poppet valve assembly 90 is shown in greater detail to have an annular nylon ring 106 reinforcing a rubber member formed thereover on both sides 108 and 110 of the reinforcing ring 106 on a radial wall thereof between skirt 112 and annular boss 114. As seen, the ring 106 is provided with an opening or passage 116 of which there may be many radial openings spaced in the radial wall portion of the ring 106. The formation of the rubber element over the ring 106 and more particularly over the boss 114 creates an annular projecting valve seat 118 which cooperates with cap 120 press fitted to stem 122 that terminates in the flange 94 aforementioned. The ring 106 is formed with radially spaced serrations 124 and 126 annularly on one side of the ring and 128 and 130 on the other side of the ring with the openings 116 being drilled between these annular projections. The annular projections increase the bonding surface for the rubber with the nylon ring 106 to insure an integrated assembly. The rubber valve member formed on the ring 106 is provided with a plurality of stub projections 132 to protect the valve during packaged shipment.

It is believed that the operation of the servomotor is readily apparent to those skilled in the art. However, a general description of its operation would show that when hydraulic fluid pressure from the master cylinder is provided to the inlet 50 it will react on plunger 100 after closing ball valve 56 over passage 54 to displace the plunger downwardly whereby the bead 96 is lapped onto flange 94 to prevent communication on chamber 14 via passage 62 and chamber 68 and passage 98 to chamber 68 whereby it is exhausted through opening 136 and communicated by tube 138 to chamber 16. Further hydraulic pressure development will act on the poppet assembly 90 to lift cap 120 from the seat 118 to begin introducing atmosphere to chamber 68 and via opening 136 and conduit 138 to chamber 16. This atmospheric pressure will be effective on the reaction diaphragm 82 to counter the effect of hydraulic pressure on the plunger 100. If further hydraulic pressure is generated to inlet 50, the plunger 100 will move to abut the stem 122 on the ring 106 and remove valve surface 134 from the valve seat 88 of the valve housing section 80 whereby greater air volume may be introduced to chamber 68 and via opening 136 and conduit 138 to chamber 16. It will be readily apparent that any lateral forces on the stem 122 as from the diaphragm 82 will cause the skirt 112 which is of nylon and substantially frictionless to abut on the housing walls with little or no effect by way of friction forces on the operation of the poppet assembly 90.

Having fully described an operative construction and advantages of this invention it is now desired to set forth the intended protection sought by these Letters Patent in the appended claims.

We claim:

1. Valve means responsive to an operator control for communicating atmospheric pressure to a power chamber of a servomotor in a power braking system, said valve means comprising:

a housing having an internal wall with a central opening dividing said housing into an atmospheric chamber and a control chamber, said control chamber adapted to be connected to a power chamber of a servomotor by conduit means;

a stem member located in said control chamber, said stem member having a flange operatively connected to said operator control, said stem member having a small diameter projection loosely extending through said central opening into said atmospheric chamber;

closure means having a pliable surface overlying said central opening in said housing with an integral reinforcing member having a peripheral skirt, said reinforcing member having a central opening loosely surrounding said projection in said atmospheric chamber with a seat of pliable material adjacent said central opening in said reinforcing member;

a cap member attached to said projection; and resilient means surrounding said central opening in said housing acting on said flange for urging said cap member against said seat of said reinforcing member and said pliable surface against said central opening in said housing to seal said atmospheric chamber from said control chamber.

2. In the valve means, as recited in claim 1, wherein said stem member moves in response to said operator control to overcome said resilient means to initially move said cap member off said seat thereby permitting atmospheric pressure to pass through said central opening in said reinforcing member and into said control chamber.

3. In a valve means, as recited in claim 2, wherein said stem member in further response to said operator control moves said pliable surface away from said central opening in said housing whereby a greater volume of atmospheric pressure is introduced into said control chamber than through said central opening in said reinforcing member.

4. In the valve means, as recited in claim 3, wherein said peripheral skirt of said reinforcing member provides a bearing surface for aligning said pliable surface with said central opening in said housing.

5. In the valve means, as recited in claim 4, wherein said central opening in said housing and said central opening in said reinforcing member permits said valve means to move laterally on said stem member when said resilient member overcomes said operator control to assume a seated condition.

References Cited

UNITED STATES PATENTS

| 222,727 | 12/1879 | Peck | 251—358X |
|---|---|---|---|
| 2,620,133 | 12/1952 | Obermaier | 137—512.15X |
| 2,918,089 | 12/1959 | McFarland | 251—358X |
| 2,994,505 | 8/1961 | Brakebill | 251—358 |
| 3,093,153 | 6/1963 | Horowitz | 251—358X |
| 3,152,608 | 10/1964 | Morrison et al. | 251—358X |
| 3,275,035 | 9/1966 | Freeby et al. | 137—630.14 |

FOREIGN PATENTS

| 908,919 | 10/1962 | Great Britain | 251—358 |

WILLIAM F. O'DEA, Primary Examiner

D. J. ZOBKIW, Assistant Examiner

U.S. Cl. X.R.

137—525, 630.14; 251—358